United States Patent
Liu et al.

(10) Patent No.: US 10,651,752 B1
(45) Date of Patent: May 12, 2020

(54) FLYBACK CONVERTER WITH RELIABLE PULSE-BASED ISOLATED COMMUNICATION

(71) Applicant: DIALOG SEMICONDUCTOR INC., Campbell, CA (US)

(72) Inventors: Wenduo Liu, Campbell, CA (US); Kun Yang, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 16/369,548

(22) Filed: Mar. 29, 2019

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 2001/0025* (2013.01)

(58) Field of Classification Search
CPC . H02M 1/08; H02M 1/092; H02M 2001/0025
USPC ............... 363/21.06, 21.07, 21.14, 21.15
See application file for complete search history.

(56) References Cited

U.S. PATENT DOCUMENTS

| | | | | |
|---|---|---|---|---|
| 2001/0030529 | A1* | 10/2001 | Stanley | H02M 3/156 323/280 |
| 2008/0192509 | A1* | 8/2008 | Dhuyvetter | H02M 3/33523 363/17 |
| 2010/0079323 | A1* | 4/2010 | Miao | H02M 3/157 341/142 |
| 2013/0107585 | A1* | 5/2013 | Sims | H02M 3/33592 363/21.14 |
| 2014/0169038 | A1* | 6/2014 | Kamath | H03D 3/00 363/16 |
| 2017/0207723 | A1* | 7/2017 | Zhang | H02M 7/537 |
| 2019/0068410 | A1* | 2/2019 | Al-Shyoukh | H03H 7/0161 |

* cited by examiner

*Primary Examiner* — Alex Torres-Rivera
(74) *Attorney, Agent, or Firm* — Haynes and Boone, LLP

(57) ABSTRACT

An isolated switching power converter communication channel is provided that comprises a pair of capacitors. A transmitter on a first side of a transformer for the converter transmits a transmitter signal over a first one of the capacitors. The transmitter also transmits a complement of the transmitter signal over a second one of the capacitors. A receiver on a second side of the transformer recovers a signal responsive to a high-pass-filtered difference of the received signals from the pair of capacitors.

16 Claims, 6 Drawing Sheets

FLYBACK CONVERTER WITH RELIABLE PULSE-BASED ISOLATED COMMUNICATION

TECHNICAL FIELD

This application relates to AC-DC isolated switching power converters such as flyback, forward, and resonant converters, and more particularly to an isolated switching power converter with pulse-based communication through a ground-isolating channel.

BACKGROUND

An isolated switching power converter such as a flyback switching power converter is typically provided with a mobile device for battery charging as its transformer provides safe isolation from AC household current. This isolation introduces a problem in that the power switching may be controlled by a primary-side controller that in turn needs to coordinate a cycling of a synchronous rectifier transistor on the secondary side. The primary-side controller cannot directly control the synchronous rectifier transistor through a wire or lead because the ground isolation is then broken. An analogous problem occurs for a secondary-side controller that must control the power switch transistor.

To accommodate the flow of control signals either from the primary side to the secondary side or from the secondary side to the primary side, it is conventional to use optoisolators. But the use of optoisolators is complicated by their wide variation in current transfer ratio and other operating parameters. An alternative is the use of digital isolators to transfer the control signals with high voltage isolation and accurate timing. A digital isolator uses a high-frequency carrier signal to modulate a gate driver signal at the transmitting side. For example, the carrier signal may be one GHz or higher in frequency, having a pulse width distortion of less than 10 ns and a common-mode transient immunity of 50V/ns.

To demodulate the transmitted signal on the receiving side, a digital isolator typically requires a low-pass filter and a relatively-fast comparator. Such digital isolators are expensive and over-qualified for typical flyback converter applications in which the common-mode transient immunity is normally less then 1 v/ns and the pulse-width distortion is larger than 50 ns.

Accordingly, there is a need in the art for flyback converters with improved communication of control signals between the primary and second sides of the transformer.

SUMMARY

An isolated switching power converter includes a ground-isolating communication channel over which a data signal may be exchanged between the primary and secondary sides of the converter's transformer. For example, the data signal may be a gate control signal for controlling a switch transistor. A controller on a first side of the transformer generates the gate control signal that is modulated by a transmitter also located on the first side of the transformer to form a modulated gate control signal. The transmitter transmits the modulated gate control signal through the ground-isolating communication channel to be received by a receiver on a second side of the transformer. The receiver demodulates the modulated gate control signal to recover a received gate control signal so that the received gate control signal may be used to control a switch on the second side of the transformer.

The first side of the transformer may be the primary side or the secondary side. If the transmitter and controller are on the primary side, the receiver would be on the secondary side. In such a primary-side embodiment, the switch may be a synchronous rectifier switch. Conversely, the transmitter and controller may be one the secondary side so that the receiver and switch would be on the primary side. In such a secondary-side embodiment, the switch may be the power switch.

To modulate the gate control signal, the transmitter transmits pulses of a clock signal from a clock source while the gate control signal is asserted. The clock signal has a relatively higher frequency as compared to the relatively slow pulsing of the gate control signal. The relatively long pulse of the gate control signal is thus replaced by multiple pulses of the clock signal that are driven into the ground-isolating communication channel by the transmitter. The ground-isolating communication channel includes a positive capacitor and a negative capacitor. The transmitter transmits the clock pulses into a transmitter terminal of the positive capacitor. Similarly, the transmitter transmits an inverted version of the clock pulses into a transmitter terminal of the negative capacitor.

Each capacitor is associated with a corresponding resistor to form a high-pass filter that passes the edges of the transmitted pulses. There is thus a first high-pass filter including the positive capacitor and a second high-pass filter including the negative capacitor. To perform the pulse-based communication disclosed herein, the receiver includes a first comparator that compares the two high-pass filtered signals so that an output signal of the comparator is responsive to a difference signal equaling a difference between the two high-pass-filtered signals. Note that this difference signal will pulse or spike high to a positive voltage in response to the rising edge of the clock pulse but then quickly fall back to ground. The difference signal then stays grounded until the falling edge of the clock pulse causes the difference signal to spike or pulse to a negative voltage. This negative spike of the difference signal then quickly returns to ground until the cycle of a positive spike followed by a negative spike repeats in response to a subsequent clock pulse.

The use of the difference signal is quite advantageous since the two high-pass filters may be matched to each other to minimize the effects of common-mode noise. Given the high-pass filtering, a static level of common-mode noise is filtered out. But note that if the common-mode noise rapidly changes in strength, the non-ideal imbalance between the high-pass filters could cause the difference signal to spike undesirably. In addition, each high-pass-filtered signal could be pushed to unsafe levels for the first comparator such that the high-pass-filtered signals should be clamped to prevent damage to the first comparator. Given this clamping, the difference signal may be discharged to zero due to the common-mode-noise change despite a rising or falling edge of the clock signal being transmitted to the receiver. To prevent these missing pulses in the difference signal from undesirably maintaining a receiver gate control signal, the first comparator advantageously responds to only one edge type and will reset the receiver gate control signal in the absence of the triggering edges. In a rising-edge embodiment, the first comparator pulses its output signal only in response to the positive pulse of the difference signal. Conversely, the first comparator pulses its output signal only in response to the negative pulse of the difference signal in a falling-edge embodiment. In the following discussion, the edge type (rising or falling) that triggers the first comparator to pulse its output signal is designated as the triggering edge.

The receiver includes a low-pass filter to filter the output signal from the comparator to produce a filtered signal. In addition, the receiver includes a second comparator that compares the low-pass-filtered signal to a positive threshold voltage. The output signal of the second comparator forms the receiver gate control signal for controlling the switch transistor on the receiver-side of the transformer. The low-pass filter has a time constant sufficiently long such that the low-pass-filtered signal will stay above the positive threshold voltage for the second comparator even if one (or several) of the triggering edges are missed. In the absence of noise, the train of clock pulses from the transmitter while the transmitter gate control signal is asserted results in a train of triggering edges in the difference signal processed by the receiver's first comparator. But sudden changes in the common-mode noise can cause one triggering edge (or perhaps several consecutive triggering edges) to be absent. The receiver is immune to such noise-caused errors due to the low-pass filtering. Should the noise continue such that the too many triggering edges are missing, the low-pass-filtered signal will drop below the positive threshold voltage for the second comparator such that the receiver gate control signal resets.

For example, suppose that the receiver-side switch transistor is a synchronous rectifier switch transistor. The pulse-based communication and control disclosed herein will only switch on the synchronous rectifier switch transistor in response to received triggering edges. But even if noise causes the resulting gate control to release the synchronous rectifier switch transistor, no pass-through condition is created in which both the power switch transistor and the synchronous rectifier switch transistor are on at the same time.

These advantageous features may be better appreciated through a consideration of the following detailed description.

DETAILED DESCRIPTION

Figure 1A:
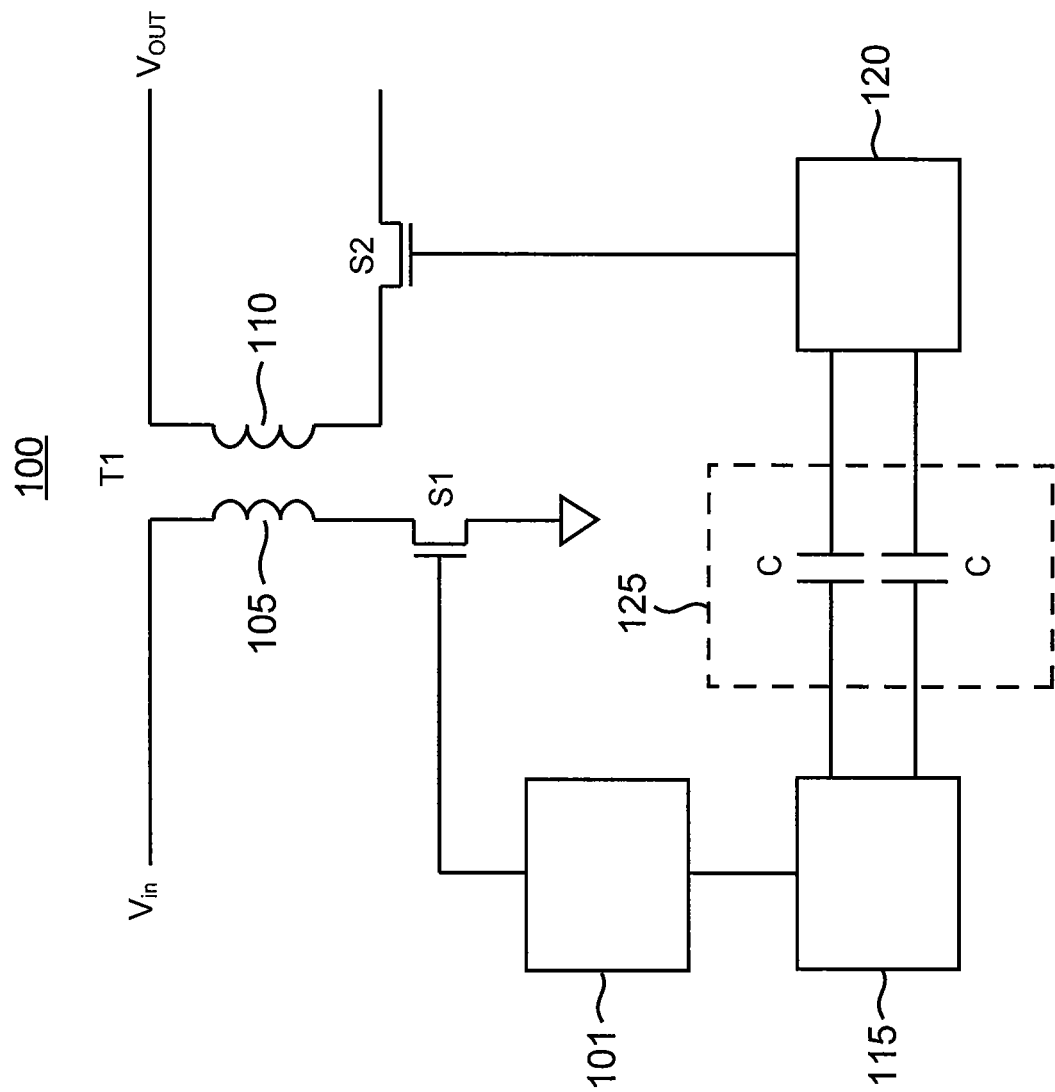
FIG. 1A illustrates a flyback converter including a ground-isolating communication channel for the transmission of a pulsed signal from a primary-side transmitter in accordance with an aspect of the disclosure.

To address the need in the art for low-cost and accurate control signal communication, an isolated switching converter is provided with a ground-isolating communication channel that propagates a pulse-based data signal. The following discussion will be directed to flyback converter embodiments, but it will be appreciated that other types of isolated switching power converters such as a forward converter or a resonant converter will also benefit from the pulse-based data signal transmission disclosed herein. In addition, the following discussion will assume that the data signal is a gate control signal but it will be appreciated that the pulse-based communication disclosed herein is suitable for communicating a wide variety of data or control signals.

On the transmitting side of the channel, a controller asserts a transmitter gate control signal for controlling a switch transistor on a receiving side of the channel. The controller is located on a first side of a transformer for the flyback converter whereas the switch transistor is located on a second side of the transformer. The first side of the transformer may be either the primary side or the second side. If the controller is on the primary side, the transistor switch may be a synchronous rectifier switch transistor. Conversely, if the controller is on the secondary side, the transistor switch may be a power switch transistor.

A transmitter is located on the same side of the transformer as the controller whereas a receiver is located on the same side of the transformer as the switch transistor. The transmitter does not transmit the transmitter gate control signal directly but instead transmits a series of clock signal pulses while the gate control signal is asserted. The clock signal pulses are relatively high frequency compared to the pulse width for the gate control signal. The receiver receives the clock signal pulses as transmitted over the ground-isolating communication channel and demodulates the received clock signal pulses to recover a receiver gate control signal. The switch transistor is then switched on or off responsive to the receiver gate control signal.

To generate the clock signal pulses, the transmitter transmits pulses of a clock signal from a clock source while the transmitter gate control signal is asserted. The clock signal has a relatively higher frequency as compared to the relatively slow pulsing of the transmitter gate control signal. The relatively long pulse of the gate control signal is thus replaced by multiple pulses of the clock signal that are driven into the ground-isolating communication channel by the transmitter. The ground-isolating communication channel includes a positive capacitor and a negative capacitor. The transmitter transmits the clock pulses into a transmitter terminal of the positive capacitor. Similarly, the transmitter transmits an inverted version of the clock pulses pulse into a transmitter terminal of the negative capacitor.

The positive and negative blocking capacitors block any DC signal transmission from the transmitter to a receiver at a receiving-end of the channel A receiving-end terminal for the positive capacitor is coupled to a first resistor to form a first high-pass filter that filters the clock pulses to form a filtered positive signal (Vp). Similarly, a receiving-end terminal for the negative blocking capacitor is coupled to a second resistor to form a second high-pass filter that filters the inverted clock pulses to form a filtered negative signal (Vn). Due to the high-pass filtering, a difference of the filtered voltages (Vp−Vn) will have a relatively-narrow positive voltage pulse in response to a rising edge for each clock pulse and then return to zero volts. Conversely, the difference of the filtered voltages will have a relatively-narrow negative voltage pulse in response to the falling edge for the clock pulse and then return to zero volts. The difference signal (Vp−Vn) may thus be denoted as an edge-triggering signal. A first comparator in the receiver responds to a particular edge (either rising or falling) in the edge-triggering signal so as to pulse its output signal. In a rising-edge-triggered embodiment, the first comparator pulses its output signal in response to a rising edge of the positive pulses in the edge-triggering signal. Conversely, the first comparator pulses its output signal in response to a falling edge of the negative pulses in the edge-triggering signal.

The receiver also includes a low-pass filter for low-pass filtering the output pulses from the first comparator. The time-constant of the low-pass filter is relatively large so that an output signal from the low-pass filter will remain asserted high even if one (or even two or more) of the comparator output pulses are missing such as due to noise or glitches. If no pulses are missing in the comparator output signal, the output signal from the low-pass filter will have substantially the same pulse width as the transmission gate control signal from the controller so that the switch may be controlled responsive to the output signal from the low-pass filter. But if missing pulses cause the output signal from the low-pass filter to be discharged to ground, note that no harm is done since the switch will simply be turned off in response to these missing pulses. To recover the receiver gate control signal, a second comparator compares the filtered output signal from the low-pass filter to a suitable threshold voltage. To avoid discontinuities in the receiver gate control signal due to missing pulses in the edge-triggering signal, the time-constant of the low pass filter and the threshold of the second comparator should be properly designed according to the noise conditions. With a large time constant for the low-pass filter and a low threshold voltage for the second comparator, the receiver gate control signal may stay high continuously despite the presence of missing edges in the edge-triggering signal. But such a design choice leads to a longer delay on the falling edge of the receiver gate control signal as compared to the same falling edge for the transmitter gate control signal. The resulting control signal transmission is quite advantageous since it avoids both the expense of digital isolators and the stability and control issues for optoisolators. Some example embodiments will now be discussed in more detail.

An example flyback converter 100 configured for pulse-triggered switch transistor control is shown in FIG. 1A. A transformer T1 includes a primary winding 105 and a secondary winding 110. A power switch transistor S1 is in series with primary winding 105. When a controller 101 controls power switch transistor S1 to switch on, a magnetizing current will develop in primary winding 105 as powered by an input voltage Vin. A synchronous rectifier switch transistor S2 in series with secondary winding 110 must be off while the primary current conducts. After controller 101 switches off power switch transistor S1, synchronous rectifier switch transistor S2 should be switched on so that the stored magnetic energy in transformer T1 can excite a secondary winding current to charge an output voltage Vout for powering a load (not illustrated). To switch on synchronous rectifier switch transistor S2, controller 101 asserts a transmitter gate control signal that is modulated by a transmitter 115 into a series of clock signal pulses driven across a ground-isolating communication channel 125. A receiver 120 recovers a receiver gate control signal from the received clock signal pulses to control synchronous rectifier switch transistor S2 accordingly.

Figure 1B:
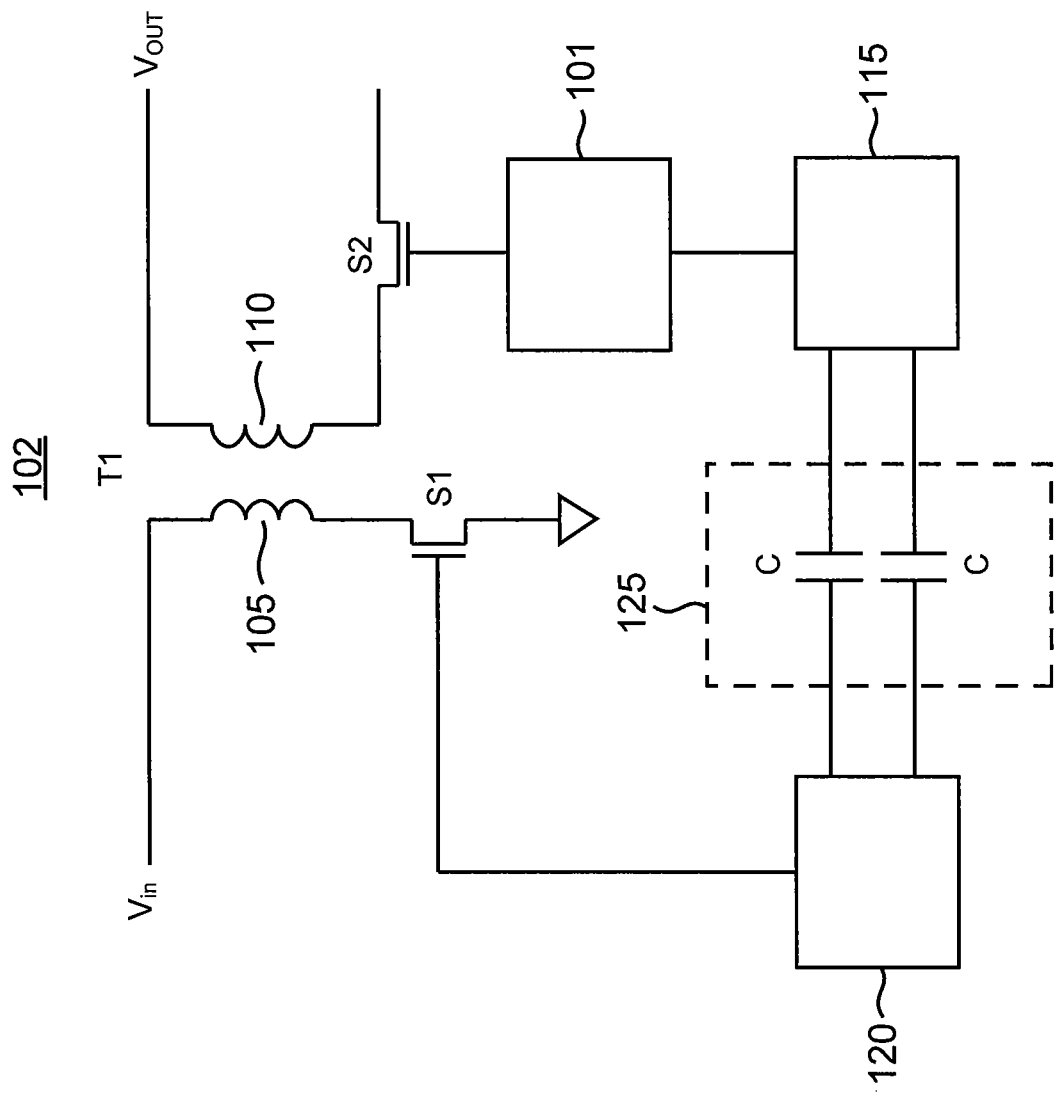
FIG. 1B illustrates a flyback converter including a ground-isolating communication channel for the transmission of a pulsed signal from a secondary-side transmitter in accordance with an aspect of the disclosure.

Note that controller 101 may instead be located on the secondary side of transformer T1 as shown for a flyback converter 102 of FIG. 1B. To regulate the output voltage, controller 101 asserts the transmitter gate control signal so that transmitter 115 transmits a series of clock signal pulses to receiver 120. Receiver 120 thus recovers the receiver gate control signal so that power switch transistor S1 may be cycled as necessary to keep the output voltage in regulation.

Figure 2A:
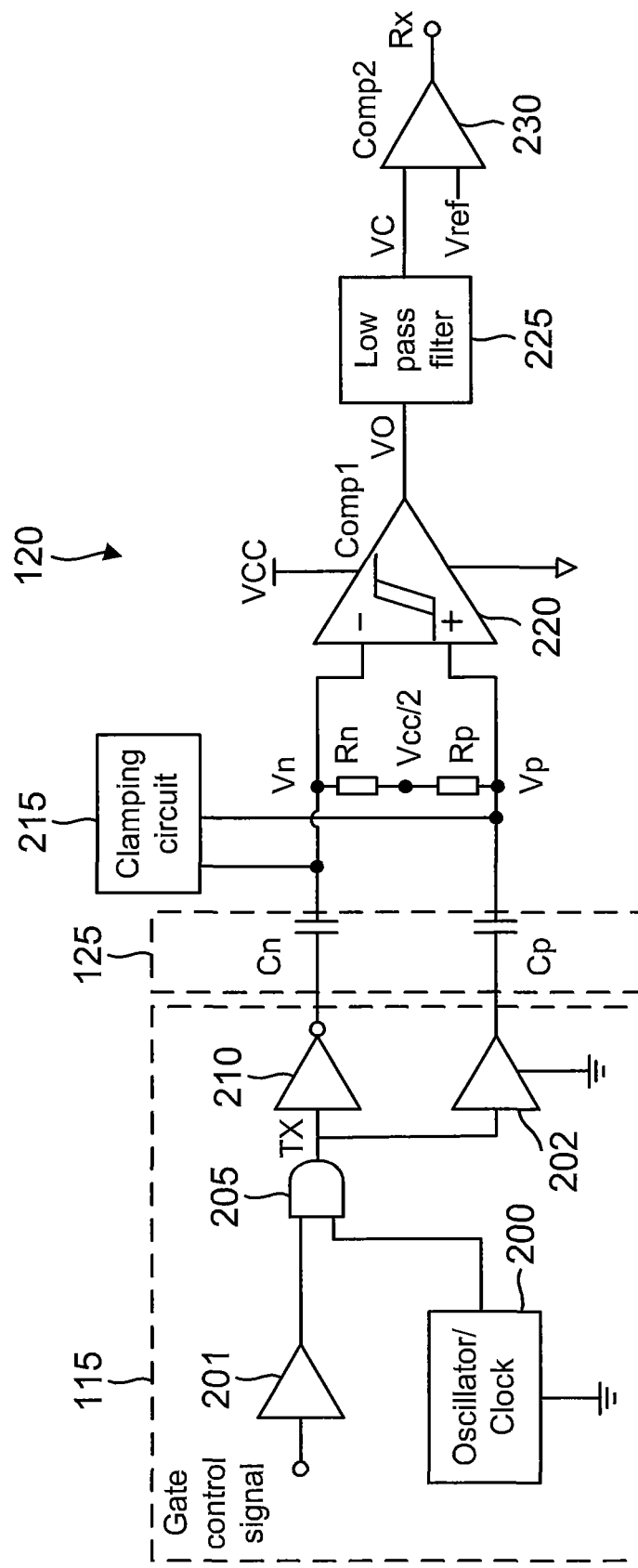
FIG. 2A is a circuit diagram for the transmitter and receiver of FIGS. 1A and 1B in accordance with an aspect of the disclosure.

Transmitter 115 and receiver 120 are shown in more detail in FIG. 2A. Transmitter 115 includes a buffer 201 for driving the transmitter gate control signal into a first terminal of an AND gate 205. An oscillator clock source 200 drives the clock signal pulses into a second terminal of AND gate 205. AND gate 205 will thus pass the clock signal pulses (TX) when the transmitter gate control signal is asserted high to a power supply voltage VCC. A buffer 202 drives the clock signal pulses into a terminal for a positive capacitor Cp in ground-isolating communication channel 125. In addition, transmitter 115 includes an inverter 210 for inverting the clock signal pulses to form inverted clock signal pulses that are driven into a terminal of negative capacitor Cn in channel 125. A receiving-end terminal for positive capacitor Cp is coupled to a resistor Rp to form the first high-pass filter that filters the clock signal pulses TX into filtered positive signal (Vp). Similarly, a receiving-end terminal for negative capacitor Cn is coupled to a resistor Rn to form the second high-pass filter that filters the inverted clock signal pulse into the filtered negative signal (Vn). Resistors Rn and Rp are coupled in series across the receiving end terminals of capacitors Cp and Cn. Resistor Rn is matched to resistor Rp. Similarly, capacitor Cp is matched to capacitor Cn. Setting aside manufacturing irregularities, the common-mode behavior of the first and second high-pass filters is thus identical.

A first comparator 220 compares the edge-triggering signal (Vp−Vn) to a comparator threshold voltage to pulse a comparator output signal VO. The polarity of the comparator threshold voltage determines what type of edge in the edge-triggering signal will trigger first comparator 220 to pulse its output signal. If the comparator threshold voltage is a positive voltage (e.g, approximately one-half of the expected peak positive voltage for the edge-triggering signal), first comparator 220 pulses its output signal VO in response to the rising edges of the positive voltage pulses in the edge-triggering signal. Conversely, first comparator 220 pulses its output signal VO in response to the falling edges of the negative voltage pulses in the edge-triggering signal if the comparator threshold voltage is a negative voltage (e.g., approximately one-half of the expected peak negative voltage for the edge-triggering signal). A low-pass filter 225 filters the comparator output signal pulses to form a filtered signal VC. To recover the receiver gate control signal, a second comparator 230 compares the filtered signal VC to a threshold voltage Vref (e.g., one-half of the power supply voltage VCC)) to form the receiver gate control signal RX. Note that receiver 120 is symmetric with regard to a node between resistors Rn and Rp. Such symmetry ensures that comparator 220 will be immune to common-mode noise that affects the filtered signals Vp and Vn. To bolster this symmetry, a voltage source (not illustrated) may bias the node between resistors Rn and Rp with a bias voltage such as VCC/2.

Figure 2B:
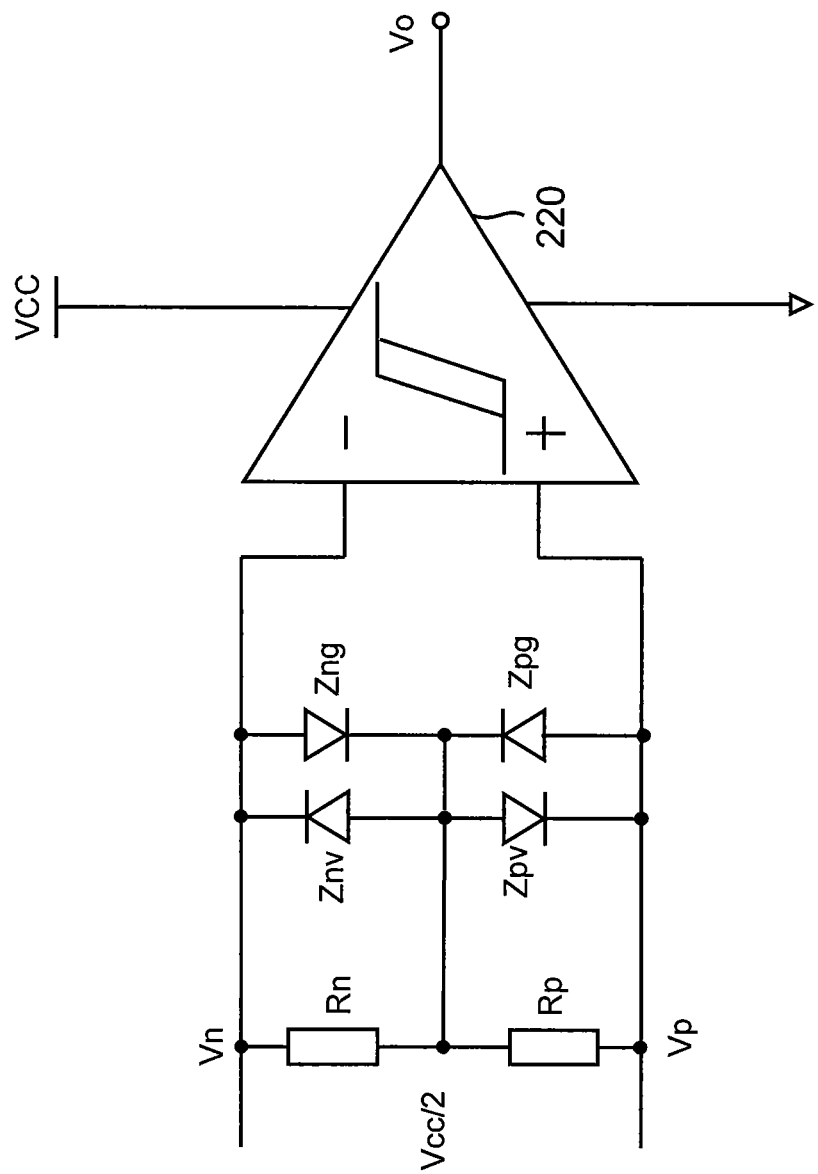
FIG. 2B is a circuit diagram for a portion of the receiver of FIG. 2A including the clamping circuit.

With respect to the common-mode noise, note that the filtered signals Vp and Vn are floating with respect to ground and the power supply voltage due to the isolation provided by the DC blocking capacitors Cn and Cp. A sudden change in the common-mode noise could thus cause the filtered signals Vp and Vn to be driven to unsafe levels for comparator 220. To protect comparator 220 from such unsafe voltage levels, a clamping circuit 215 functions to clamp the filtered signals Vp and Vn to a safe voltage level. This clamping may be restricted to a certain voltage range so that the edge-triggering signal (Vp−Vn) is not big enough to falsely trigger comparator 220 due to mismatch between the differential data paths while the common-mode noise is asserted. For example, as shown in FIG. 2B, clamping circuit 215 may be implemented by a diode Zng having its anode coupled to the negative input terminal for comparator 220 and its cathode coupled to the Vcc/2 node. A diode Znv is coupled in opposition to diode Zng such that it is the anode of diode Znv that is tied to the Vcc/2 node. In such an embodiment, clamping circuit 215 also includes a diode Zpg having its anode coupled to the positive input terminal for comparator 220 and having its cathode tied to the VCC/2 node. A diode Zpv is coupled in opposition to diode Zpg such that it is the cathode of diode Zpv that is coupled to the positive terminal for comparator 220.

Figure 3A:
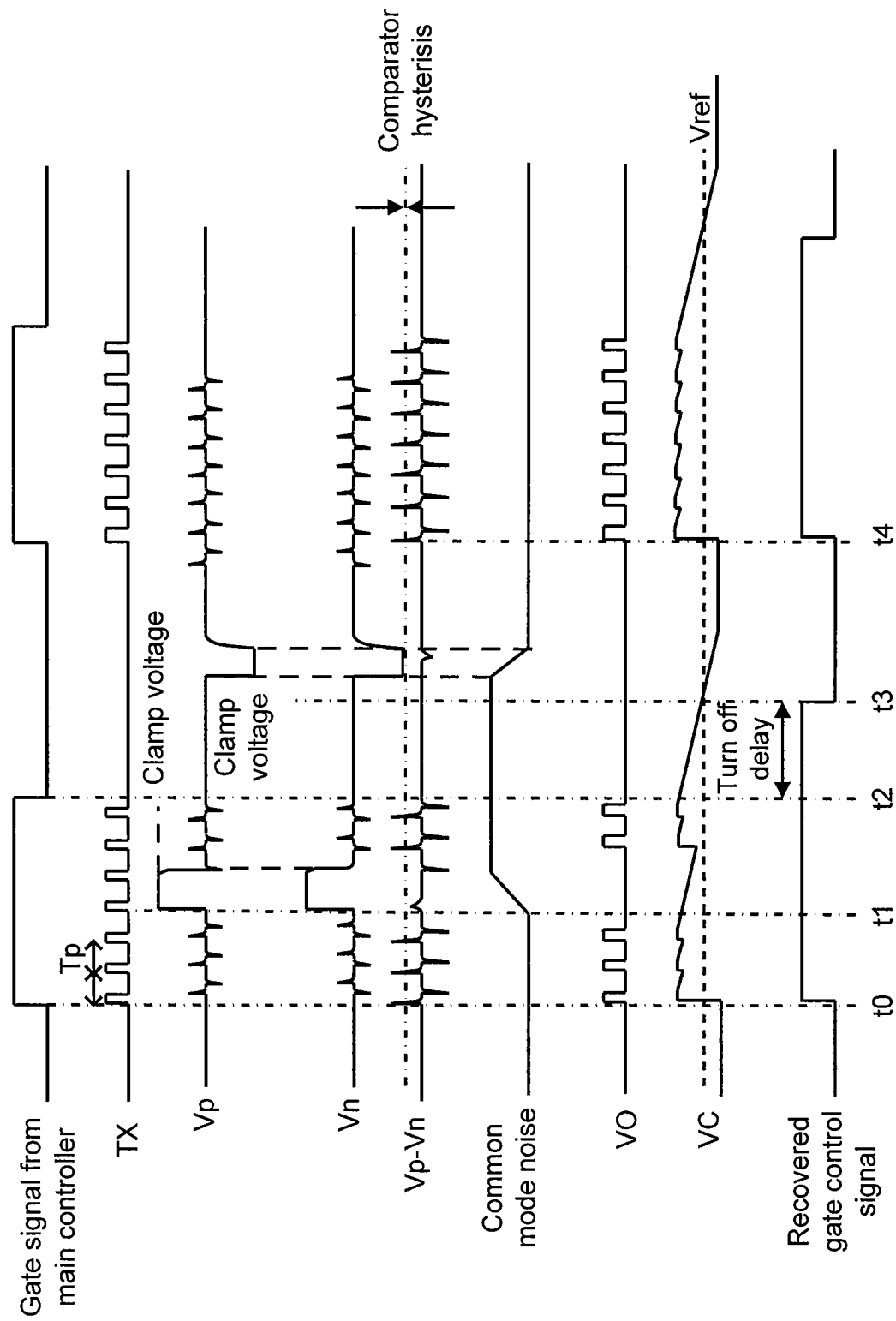
FIG. 3A illustrates some waveforms for the transmitter and receiver of FIG. 2 for a rising-edge-triggered embodiment.

Some waveforms for the gate control signal, the clock pulse signal TX, the edge-triggering signal (Vp−Vn), the comparator output signal VO, and low-pass-filtered signal VC and the recovered gate control signal are shown in FIG. 3A for a rising-edge-triggered embodiment in which comparator 220 applies a positive threshold voltage. At a time t0, the gate control signal pulses high to allow AND gate 205 (FIG. 2A) to pass a series of clock signal pulses (TX). The rising edge for each clock signal pulse causes the edge-triggering signal to have a transient positive pulse that exceeds the positive threshold voltage for comparator 220 and then falls back below this threshold voltage. Alternatively, comparator 220 may implement hysteresis so that the positive threshold voltage for triggering the rising edge of a comparator output pulse VO is different from a positive threshold voltage for triggering a falling edge of the comparator output pulse VO. The comparator output signal VO will thus pulse each time the rising edge of the edge-triggering signal exceeds the positive threshold voltage. Prior to a time t1, each positive pulse of the edge-triggered signal causes the comparator output signal VO to pulse high. The comparator output signal VO thus mimics the clock signal pulses TX except for a minor processing delay.

The goal of the pulse-based transmission is to make the receiver signal gate control signal sensitive to the onset of comparator output signal pulses VO responsive to the rising edges in the edge-triggering signal while being relatively insensitive to an occasional loss of one of these rising edges. As noted earlier, the symmetric arrangement of the high-pass filtering that forms the edge-triggered signal makes the edge-triggered signal immune to common-mode noise. But the clamping of the Vp and Vn signals causes the edge-triggering signal to have missing edges during period of sudden changes in the common-mode noise. For example, the common-mode noise suddenly changes its amplitude beginning at a time t1. At time t1, the common-mode noise changes cause the Vp and Vn signals to be clamped such that the edges of the edge-triggering signal are temporarily lost. Two of the clock signal pulses TX starting at time t1 thus fail to trigger rising edges in the edge-triggering signal. But the low-pass filtering from low-pass filter 225 (FIG. 2A) causes the filtered signal VC to remain above the threshold voltage Vref for second comparator 230 (FIG. 2A). The receiver gate control signal thus remains asserted despite the missing pulses starting at time t1. This is quite advantageous in that the reliability of the gate control signal transmission is boosted.

To prevent low-pass filter 225 from filtering the rising edge of the comparator output signal VO at time t0, low-pass filter 225 may include, for example, a diode coupled between its input and output nodes. The rising edge of the comparator output signal VO will thus be passed by such a diode so that the recovered gate control signal may be asserted high at time t0. The low-pass filtering may thus be imposed only on the falling edges for the comparator output signal VO. In alternative embodiments, low-pass filter 225 may filter both the rising and falling edges of the comparator output signal VO. Referring again to FIG. 3A, the transmitter gate control signal is de-asserted at a time t2. Following the time-constant delay (turn off delay) from low-pass filter 225, the receiver gate control signal will thus be discharged at a time t3. This transmission process repeats beginning at time t4 for the transmission of another transmitter gate control signal.

Figure 3B:
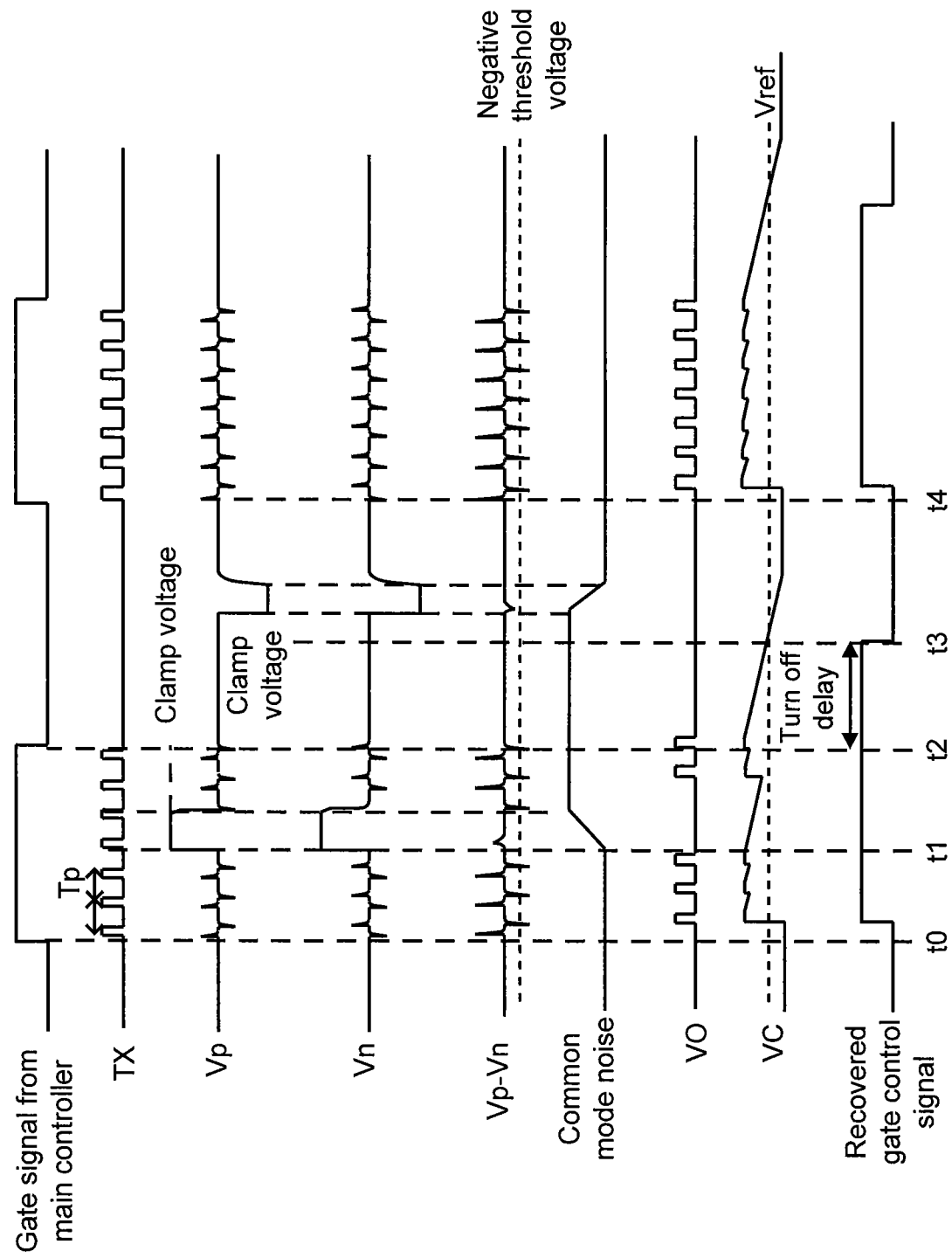
FIG. 3B illustrates some waveforms for the transmitter and receiver of FIG. 2 for a falling-edge-triggered embodiment Embodiments of the present disclosure and their advantages are best understood by referring to the detailed description that follows. It should be appreciated that like reference numerals are used to identify like elements illustrated in one or more of the figures.

Analogous waveforms for a falling-edge-triggered embodiment in which comparator 220 employs a negative threshold voltage are shown in FIG. 3B. At time t0, the transmitter gate control signal pulse begins so that a series of clock pulses TX are transmitted across the channel to the receiver. The negative pulses of the resulting edge-triggering signal each has a falling edge that descends below the negative threshold voltage for comparator 220 to trigger corresponding comparator output pulses VO. At time t1, the common-mode noise changes cause the Vp and Vn signals to be clamped such that the edges of the edge-triggering signal are temporarily lost. But the low-pass filtering of the comparator output pulses TX prevents the filtered signal VC from falling below the threshold voltage for comparator 230 so that the receiver gate control signal remains asserted. At time t2, the transmitter gate control signal falls low, which results in the receiver gate control signal falling low at time t3 due to the low-pass filter and processing delay. A new transmitter pulse begins at time t4 to repeat the transmission cycle.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:
1. An isolated switching power converter, comprising;
   a ground-isolating communication channel spanning between a transmitter on a first side of a transformer for the isolated switching power converter and a receiver on a second side of the transformer, wherein the ground-isolating communication channel includes a first capacitor connected to a first resistor to form a first high-pass filter configured to high-pass filter a received clock pulse signal to form a first filtered signal and a second capacitor connected to a second resistor to form a second high-pass filter configured to high-pass filter a complement of the received clock pulse signal to form a second filtered signal; and wherein the receiver includes:

a first comparator configured to assert a comparator output signal responsive to a difference between the first filtered signal and the second filtered signal; and a low-pass filter configured to low-pass filter the comparator output signal to form a low-pass filtered signal; and a second comparator configured to compare the low-pass filtered signal to a threshold voltage to form a recovered data signal, wherein the receiver is configured to switch on a switch transistor responsive to an assertion of the recovered data signal and to switch off the switch transistor responsive to the recovered data signal being grounded.

2. The isolated switching converter of claim 1, further comprising:

a clamp circuit configured to clamp the first filtered signal and to clamp the second filtered signal.

3. The isolated switching converter of claim 2, wherein the clamp circuit comprises:

a first pair of diodes configured to clamp the first filtered signal; and a second pair of diodes configured to clamp the second filtered signal.

4. The isolated switching converter of claim 1, wherein the first side of the transformer is a primary-winding side of the transformer and the second side of the transformer is a secondary-winding side of the transformer.

5. The isolated switching converter of claim 4, wherein the switch transistor is a synchronous rectifier switch transistor.

6. The isolated switching converter of claim 1, wherein the transmitter comprises:

an oscillator configured to generate a clock pulse signal; and an AND gate configured to AND the clock pulse signal with a gate control signal to form a transmitted clock pulse signal.

7. The isolated switching converter of claim 6, wherein the transmitter further comprises:

a buffer for driving the transmitted clock pulse signal into a first terminal of the first capacitor; and an inverter for inverting the transmitted clock pulse signal into an inverted version of the transmitted clock signal and for driving a first terminal of the second capacitor with the inverted version of the transmitted clock pulse signal.

8. The isolated switching converter of claim 1, wherein the first side of the transformer is a secondary-winding side of the transformer and the second side of the transformer is a primary-winding side of the transformer.

9. The isolated switching converter of claim 8, wherein the switch transistor is a power switch transistor.

10. The isolated switching converter of claim 1, wherein the first comparator is a first hysteresis comparator.

11. The isolated switching converter of claim 1, wherein the first comparator is further configured to compare the difference between the first filtered signal and the second filtered signal to a positive threshold voltage.

12. The isolated switching converter of claim 1, wherein the first comparator is further configured to compare the difference between the first filtered signal and the second filtered signal to a negative threshold voltage.

13. A method of controlling a switch in a flyback converter, comprising:

in a controller on a first side of transformer in the flyback converter, asserting a gate control signal to control a cycling of a switch transistor on a second side of the transformer;

while the gate control signal is asserted, transmitting a pulsed signal into a first capacitor and transmitting a complement of the pulsed signal into a second capacitor;

high-pass filtering a first signal received from the first capacitor to form a first filtered signal;

high-pass filtering a second signal received from the second capacitor to form a second filtered signal;

recovering a received pulsed signal responsive to a difference between the first filtered signal and the second filtered signal;

low-pass filtering the received pulsed signal to form a low-pass filtered signal; and controlling the switch transistor on the second side of the transformer responsive to the low-pass filtered signal being greater than a threshold voltage, wherein the first side of the transformer is a primary-winding side of the transformer and the second side of the transformer is a secondary-winding side of the transformer, and wherein controlling the switch transistor comprises controlling a synchronous rectifier switch transistor.

14. The method of claim 13, wherein controlling the synchronous rectifier switch transistor comprises turning on the synchronous rectifier switch transistor responsive to the low-pass filtered signal being greater than the threshold voltage and switching off the synchronous rectifier switch transistor responsive to the low-pass filtered signal being less than the threshold voltage.

15. The method of claim 13, wherein recovering the received pulsed signal responsive to the difference between the first filtered signal and the second filtered signal comprises comparing the first filtered signal to the second filtered signal in a comparator, and wherein the received pulsed signal comprises an output signal of the comparator.

16. The method of claim 15, wherein the comparing of the first filtered signal to the second filtered signal in the comparator comprises asserting the output signal of the comparator responsive to a first positive threshold voltage and grounding the output signal of the comparator responsive to a second positive threshold voltage.

* * * * *

UNITED STATES PATENT AND TRADEMARK OFFICE
CERTIFICATE OF CORRECTION

PATENT NO. : 10,651,752 B1
APPLICATION NO. : 16/369548
DATED : May 12, 2020
INVENTOR(S) : Wenduo Liu and Kun Yang Page 1 of 1

It is certified that error appears in the above-identified patent and that said Letters Patent is hereby corrected as shown below:

In the Specification

In Column 4, Line 55, change "an inverted version of the clock pulses pulse into" to --an inverted version of the clock pulses into--.

Signed and Sealed this
Twenty-eighth Day of July, 2020

Andrei Iancu
*Director of the United States Patent and Trademark Office*